United States Patent
Honda (10) Patent No.: US 8,202,188 B2
(45) Date of Patent: Jun. 19, 2012

(54) STRUCTURE FOR COUPLING DIFFERENTIAL ASSEMBLY WITH DRIVE SHAFT

(75) Inventor: Toru Honda, Takasaki (JP)

(73) Assignee: Carrosser Co. Ltd., Takasaki-Shi (JP)

( * ) Notice: Subject to any disclaimer, the term of this patent is extended or adjusted under 35 U.S.C. 154(b) by 323 days.

(21) Appl. No.: 12/656,868

(22) Filed: Feb. 18, 2010

(65) Prior Publication Data

US 2011/0160017 A1    Jun. 30, 2011

(30) Foreign Application Priority Data

Dec. 25, 2009   (JP) .................................. 2009-293819

(51) Int. Cl.
    *F16H 48/22*   (2006.01)

(52) U.S. Cl. ........................................ 475/231; 475/234

(58) Field of Classification Search .................. 475/223, 475/231, 234
    See application file for complete search history.

(56) References Cited

U.S. PATENT DOCUMENTS

| 2002/0132694 A1* | 9/2002 | Okazaki ........................ 475/231 |
| 2003/0054914 A1* | 3/2003 | Tomari et al. .................. 475/231 |
| 2008/0242469 A1* | 10/2008 | Jenski et al. .................. 475/231 |
| 2008/0287246 A1* | 11/2008 | Sackl et al. .................... 475/223 |

* cited by examiner

*Primary Examiner* — Edwin A Young
(74) *Attorney, Agent, or Firm* — Manabu Kanesaka (57) ABSTRACT

A coupling structure is provided which can be used even when drive shafts cannot be provided on their end with a stopper. The coupling structure allows the drive shafts to be coupled to a differential assembly, requiring a manipulation only from outside the differential case to assure that the drive shafts are coupled to each other so as not to be movable in the direction of the axle shaft. The coupling structure includes a pair of right and left coupling heads and a coupling shaft. Each of the coupling heads has a coupling hole at the point of intersection of the axial line of pinion shafts provided in the differential assembly and the axial line of a pair of right and left drive shafts. The coupling heads are added to the drive shafts via a connector, respectively, to be rotatable about the axle shaft and not movable in the direction of the axle shaft, with the end portion of the coupling heads being disposed in a coupling ring of a cross shaft. The coupling shaft penetrates the through holes of the pair of pinion shafts and the coupling holes of the pair of right and left coupling heads.

10 Claims, 3 Drawing Sheets

STRUCTURE FOR COUPLING DIFFERENTIAL ASSEMBLY WITH DRIVE SHAFT

BACKGROUND OF THE INVENTION

1. Field of the Invention

The present invention relates to a structure for coupling a differential assembly installed in an automobile with the right and left drive shafts connected to the right and left traction wheels. More particularly, the invention relates to a limited slip differential assembly.

2. Description of the Related Art

The power transmission mechanism of vehicles includes a differential assembly through which power is transmitted and the right and left drive shafts which transfer the drive force supplied to the differential assembly to the right and left traction wheels, respectively.

The differential assembly includes a differential carrier mounted on the vehicle body and a differential case installed inside the differential carrier. The differential case has the right and left end portions that are rotatably supported by the differential carrier, for example, via bearings. Accordingly, the differential case is prohibited from moving in the right and left direction, i.e., in the axial direction of the drive shafts with respect to the differential carrier.

The differential assembly includes: right and left side gears which the right and left drive shafts each mate with splines; a pinion shaft disposed between the right and left side gears; pinion gears which are rotatably supported at both end portions of the pinion shaft and mate with the right and left side gears, respectively; and a tubular differential case that accommodates these members. The assembly is configured such that the end portions of the pinion shaft fit in the through holes formed in the outer circumferential wall of the differential case, respectively, thereby prohibiting the pinion shaft with a washer or the like from radially moving.

In contrast to such a typical, differential assembly, there is another type of differential assembly known as a limited slip differential assembly which includes right and left friction clutches, right and left pressure rings, and a cam mechanism. The friction clutches are configured such that a plurality of friction clutch disks are disposed, to be movable in the direction of the axle shaft, between the shaft portion of right and left side gears and the differential case. The pressure rings are disposed opposite to each other to cover each of the right and left side gears, and moved away from each other in the direction of the axle shaft, thereby pushing each of the right and left friction clutches outwardly in the direction of the axle shaft. The cam mechanism expands the spacing between the pair of right and left pressure rings in the direction of the axle shaft. The cam mechanism is composed of a cam surface portion 60 which is formed circumferentially, for example, at four points on the opposing portions of the pair of right and left pressure rings, and a cam portion which is formed at each shaft end portion of a pinion shaft formed in the shape of a cross and engages with the cam surface.

Here, the right and left drive shafts are coupled to prevent movement in both directions along the axle shaft with respect to the differential assembly and the limited slip differential assembly, maintaining the distance between the right and left traction wheels. The right and left drive shafts may be coupled to the differential assembly, for example, in a type of structure, as disclosed in Patent Document 1, with the drive shafts having a constant outer diameter. Now, a description will be made to this coupling structure with reference to FIG. 3.

Figure 3:
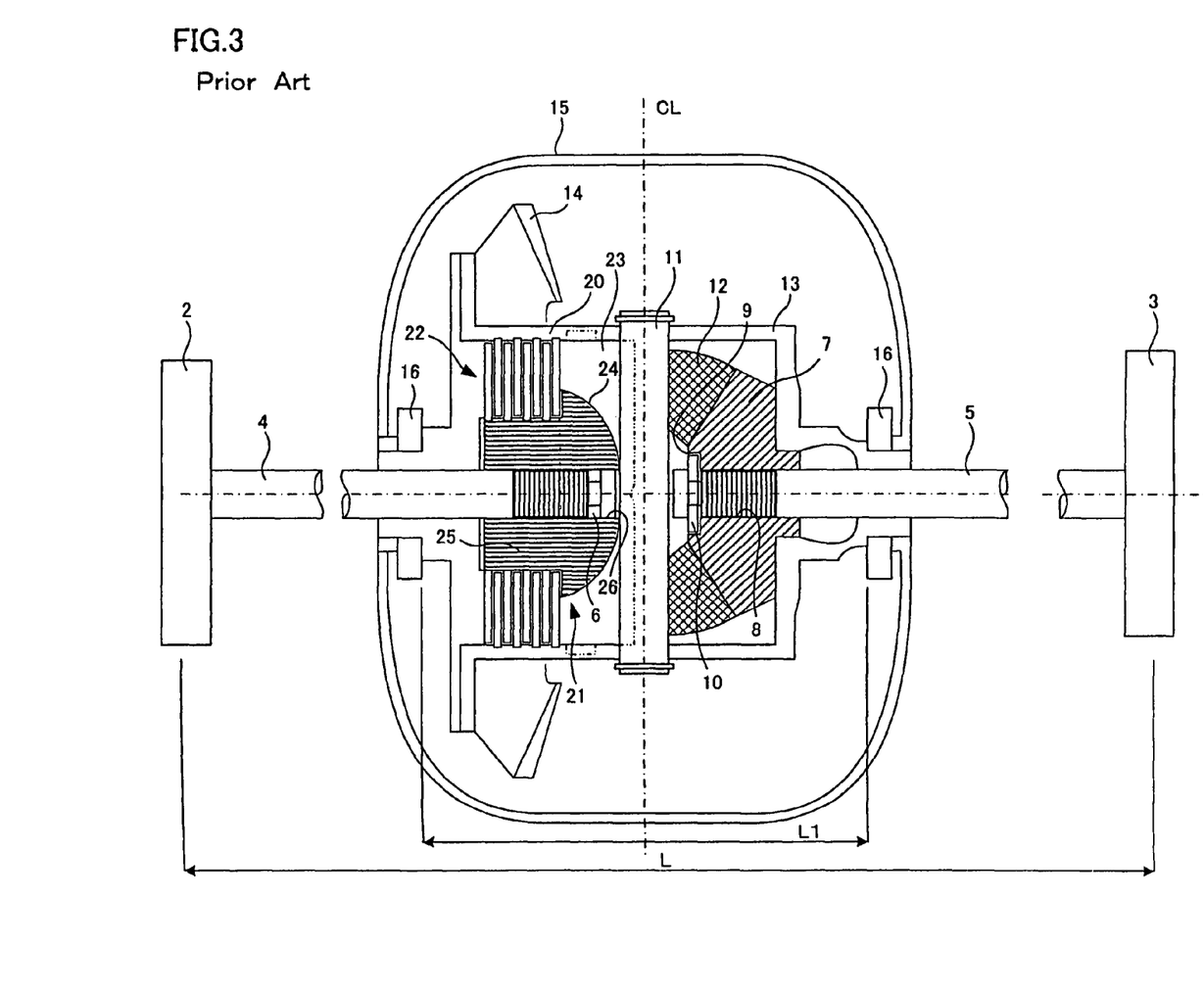
FIG. 3 a longitudinal sectional view illustrating a conventional coupling structure for a differential assembly and drive shafts.

FIG. 3 shows a half of a differential assembly 1 whose right half with respect to a center line CL is a typical differential assembly. In FIG. 3, right and left drive shafts 4 and 5 each have a circumferential groove 6 at their one inner axial end portion and are attached with tires (traction wheels) 2 and 3 at the other end, respectively. Here, let the distance between the right and left tires be L. As illustrated, there is a side gear 7 on the right side with respect to the center line CL. The gear 7 has, on an inner end face opposing the center line CL, a recessed portion 9 formed around a shaft hole 8 through which the drive shaft 5 passes. The circumferential groove 6 receives a disk-shaped stopper disk 10 which fits into the recessed portion 9, prohibiting the drive shaft 5 from becoming dislodged. The inner end of the drive shaft 5 is brought into contact with a pinion shaft 11 to prevent the drive shaft 5 from being pushed in, thereby maintaining the distance L between the right and left tires.

The pinion shaft 11 is attached rotatably at an end portion thereof with a pinion gear 12, and engages, at its end portions, with the cylindrical portion of a differential case 13. In addition, the differential case 13 is provided securely on its outside with a ring gear 14. Then, the ring gear 14 and the differential case 13 are accommodated in a differential carrier 15.

In such a drive shaft coupling structure for a differential assembly, the stopper disk 10 is either mounted or extracted under such a condition that the pinion shaft 11 has been drawn out of the differential case 13 and the drive shaft 5 has been pushed towards the center line CL. The differential case 13 is provided with a large maintenance opening for exposing the components under the condition as illustrated, thereby allowing the pinion shaft 11 formed of a single shaft to be extracted. This would make it possible to move the drive shaft 5 by a small distance towards the center line CL, thus facilitating the extracting and mounting of the stopper disk 10 through the maintenance work opening.

[Patent Document]

[Patent Document 1] U.S. Pat. No. 7,270,026

In a vehicle equipped with the typical differential assembly shown in FIG. 3, suppose that the differential assembly is replaced with a limited slip differential assembly. In this case, the following method is advantageous in terms of costs and easiness in the replacement. That is, only the differential case and those various types of additional components to be disposed for the limit slip differential assembly within the differential case may be incorporated, without replacing the differential carrier 15, the ring gear 14, and the drive shafts 4 and 5.

In this case, as shown on the left side of the center line CL in FIG. 3, modifications may be made to the shape and size of a differential case 20 and a side gear 21. Furthermore, the assembly is additionally provided with a friction clutch 22, a pressure ring 23 shown in a chain double-dashed line, a pinion shaft having a generally cross-like shape, and a cam mechanism.

However, to use the differential carrier 15 again, the distance between the right and left of the new differential case 20 is restricted to the inter-bearing distance L1 between the right and left bearing portions 16 which support the respective right and left end portions of the differential case 13 inside the differential carrier 15.

On the other hand, the new side gear 21 has a gear portion 24 formed on the center line side, and a shaft portion 25 formed axially outwardly to carry the friction clutch 22, resulting in the entire length being axially greater than the side gear 7 of a typical differential assembly 1. Furthermore, due to the restriction that the dimensions of each member in the direction of the axle shaft have to be determined within the aforementioned distance L1, the gear portion 24 of the new side gear 21 inevitably extends beyond the inner end of the drive shaft 4 towards the pinion shaft 11.

The inner end of the drive shaft 4 to be inserted into a shaft hole 26 of the new side gear 21 is located deeper than the inner end of the shaft hole 26. Thus, the stopper disk 10 cannot be received in the circumferential groove 6 of the drive shaft 4 to prevent it from becoming dislodged.

Furthermore, the limited slip differential assembly is configured such that four pinion shafts are assembled in the shape of a cross and each pinion shaft is attached at the end portion thereof with a pinion gear. In addition, the side gear is covered with the pressure ring 23. It is thus not possible to couple the drive shafts using the stopper disk 10.

SUMMARY OF THE INVENTION

The present invention was developed to solve these problems. It is an object of the invention to provide a coupling structure for a differential assembly and drive shafts. The coupling structure allows the drive shafts to be coupled to the differential assembly even with the structure in which a stopper portion cannot be provided to the end portions of the drive shafts, requiring a manipulation only from outside the differential case to assure that the drive shafts are Coupled to each other so as not to be movable in the direction of the axle shaft.

The coupling structure for a differential assembly and drive shafts, which realizes the objects of the present invention is implemented by the following configuration. The structure is composed of a differential assembly, a pair of right and left drive shafts, a pair of right and left coupling heads, and a coupling shaft. The differential assembly at least includes: a pair of right and left side gears which are disposed opposite to each other in a direction of an axle shaft within a differential case supported rotatably about the axle shaft with respect to a differential carrier; a pinion shaft body which is disposed between the pair of right and left side gears, the pinion shaft body including at least a pair of pinion shafts which extend radially outwardly opposite to each other from a coupling ring having a hole about the axle shaft, the pinion shaft body including a through hole formed longitudinally; and a pinion gear which is rotatably mounted on an end of the pinion shaft to mate with the pair of right and left side gears. The right and left drive shafts are coupled nonrotatably to the pair of right and left side gears, respectively, but movably in the direction of the axle shaft, and disposed with their end faces being opposed to each other by a given distance. The right and left coupling heads each have a coupling hole at the point of intersection of an axial line of the pair of right and left drive shafts and an axial line of the pinion shaft, the coupling heads being attached to the pair of right and left drive shafts, respectively, to be rotatable about the axle shaft and not movable in the direction of the axle shaft, with an end portion thereof being disposed in the coupling ring of the pinion shaft body. The coupling shaft is inserted into the through holes of the pair of opposing pinion shafts through the coupling holes of the pair of right and left coupling heads.

This differential assembly may be a limited slip differential assembly, which can be configured, for example, as follows. That is, the limited slip differential assembly can employ a cross-shaped pinion shaft body that is constituted by a pair of opposing pinion shafts having a through hole and a pair of opposing solid pinion shafts. On both sides of the pinion shaft body, a pair of right and left pressure rings are disposed on an inner circumferential surface of the differential case so that the rings are movable in the direction of the axle shaft and nonrotatable around the axle shaft. Friction clutches are also disposed between the pair of right and left side gears and the sidewalls at the ends of the differential case, respectively. Furthermore, each pinion shaft has a cam portion disposed at the end portion thereof, and the pair of right and left pressure rings are each provided with a cam surface to engage with each cam portion.

The pair of right and left drive shafts can be configured, for example, such that a circumferential groove is formed on their end portions, and splines that engage with those splines formed on the shaft hole of the side gears following rearward from the circumferential groove are formed on outer circumferences of the drive shafts. This configuration allows the drive shafts to be movable in both directions along the axle shaft.

According to the invention set forth in claim 1, the right and left drive shafts are moved in the direction of the axle shaft so that the coupling holes of the right and left coupling heads are aligned on the axial line of the pinion shafts in the coupling ring of the pinion shaft body. Under this condition, the coupling shaft is pushed from the through hole of one pinion shaft toward the through hole of the other pinion shaft. Only this manipulation allows the coupling shaft to be inserted into the coupling holes of the right and left coupling heads, thus making it possible to prevent the pair of right and left drive shafts from moving in both axial directions.

This configuration makes it possible to couple the pair of right and left drive shafts to the differential assembly. This can be done only by attaching the coupling heads to the drive shafts so that the coupling heads are incapable of moving in the direction of the axle shaft but rotatable about the axle shaft and by pushing the coupling shaft into the through holes of the pinion shafts. This advantage is available, for example, even when it is difficult due to space restriction to insert a fork-shaped stopper disk into the respective circumferential grooves formed on the end portions of the pair of right and left drive shafts, thereby allowing the side gear to prevent the drive shaft from becoming dislodged. The same advantage can also be realized even in the presence of a structural problem that the circumferential groove formed on the end portion of the drive shaft is located inside the shaft hole of the side gear, and the fork-shaped stopper disk cannot be used.

Suppose that a typical differential assembly is replaced by a limited slip differential assembly using again the differential carrier and the pair of right and left drive shafts with no changes made thereto. In this case, the length of the new differential case in the right and left directions is restricted by the bearing of the differential carrier or the like. The axial length of the pair of right and left side gears accommodated in the differential case has also to be elongated due to the friction clutches, thus inevitably causing the gear portion of the side gear to be extended toward the pinion shaft. Accordingly, the circumferential groove formed on the end portion of the reused drive shaft comes into the shaft hole of the side gear.

However, even in such a case, the drive shaft can be coupled to the differential assembly only by attaching the coupling head to the drive shaft and then inserting the coupling shaft into the through hole of the pinion shaft, i.e., without requiring complicated and time-consuming assembling work. It is thus possible to replace easily a typical differential assembly by the limited slip differential assembly.

According to the invention set forth in claim 2, using the 2-way split connector makes it possible to easily add the coupling head to the drive shaft. Furthermore, the connector has an outer diameter that permits it to be inserted into the shaft hole of the side gear. This allows the drive shafts to be axially moved in order to position the coupling holes of the coupling heads, thus preventing the 2-way split connector from being separated. In particular, when the drive shafts are reused, it is possible to easily add the coupling head by utilizing the circumferential groove formed on the end portion of the drive shaft.

According to the invention set forth in claim 3, the spacer ring prevents the side gear from moving in the direction of the axle shaft and the 2-way split connector from being separated into two.

According to the invention set forth in claim 4, the top flange portion serving as the front end surface of the first circumferential groove has a diameter less than that of the drive shaft. This ensures an enough thickness of the connector to allow the connector to be smoothly inserted into the shaft hole of the side gear. For example, when the drive shaft is coupled to the side gear with splines, the connector can be smoothly inserted into the shaft hole of the side gear. This can be done by making the outer diameter of the connector slightly less than the inner diameter of the splines of the side gear or the same as the valley diameter of the splines of the drive shaft.

According to the invention set forth in claim 5, the coupling head to be attached to the end of the drive shaft can be easily made rotatable with respect to the drive shaft. It is thus possible to prevent the drive shaft and the pinion shaft to be integrally coupled with each other, ensuring the operation of the differential gear mechanism that is composed of the pair of right and left side gears, the pinion gears, the pinion shafts and the like.

According to the invention set forth in claim 6, the shaft hole of the sleeve member has such an inner diameter which is tight and just enough for the coupling shaft, to pass through. This configuration allows for attaching the coupling shaft to the pinion shaft body without looseness even when the through hole of the pinion shaft has an inner diameter that is loose for the coupling shaft to pass through. It is thus possible to prevent play of the coupling heads.

According to the invention set forth in claim 7, with the pair of right and left coupling heads opposing to each other, the end portions of the connectors are inserted over between the mutual distal end and proximal end portions, thereby preventing looseness between the coupling heads.

According to the inventions set forth in claims 8 and 9, the coupling shaft can be prevented from becoming dislodged.

According to the invention set forth in claim 10, the right and left drive shafts can be easily coupled to the limit slip differential assembly which has a very narrow space between the pair of right and left side gears.

DETAILED DESCRIPTION OF PREFERRED EMBODIMENT

Now, the present invention will be described below in more detail with reference to the accompanying drawings in accordance with an embodiment.

Figure 1:
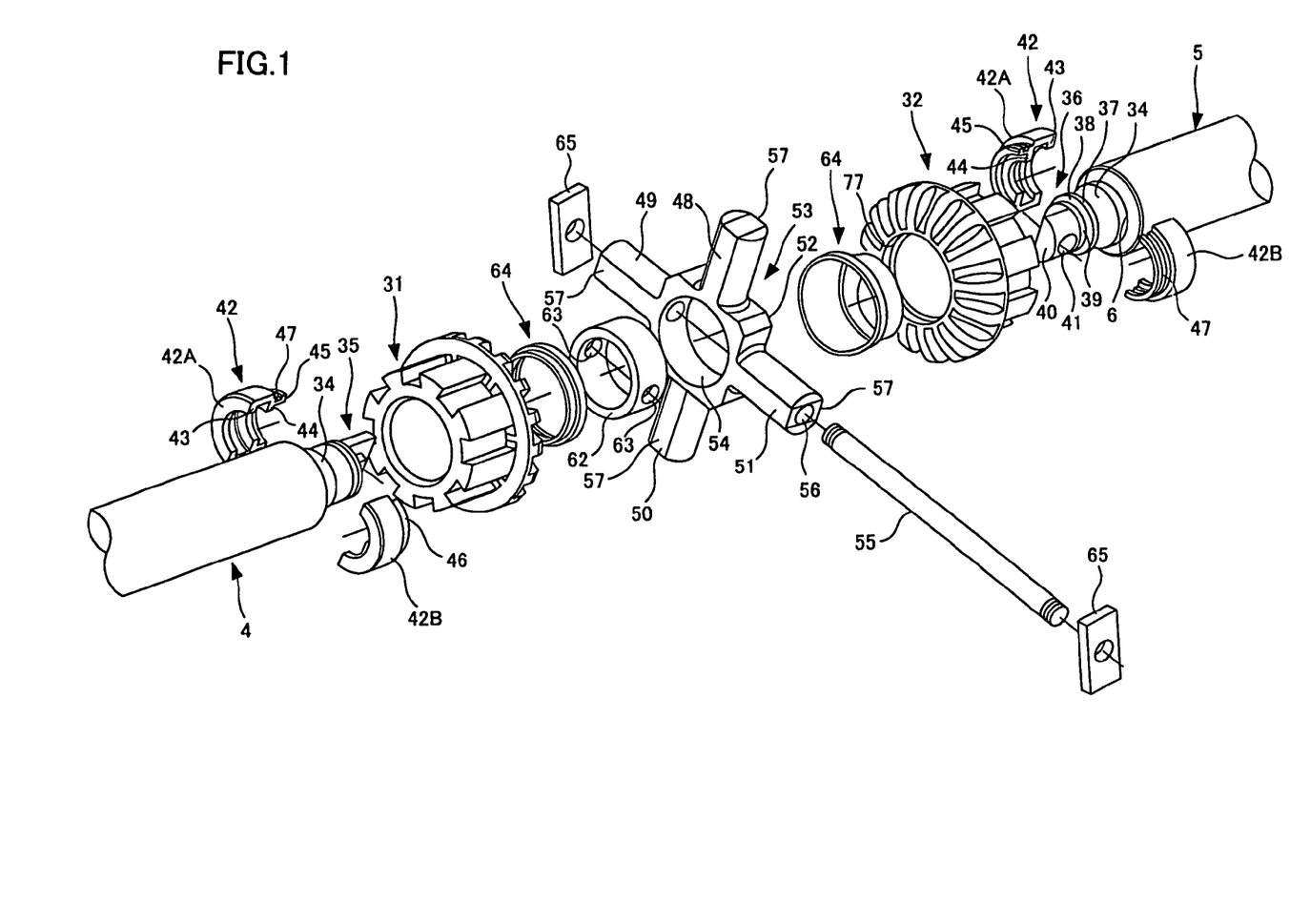
FIG. 1 is an exploded perspective view illustrating a coupling structure for a differential assembly and drive shafts according to an embodiment of the present invention.
Figures 2A, 2B:
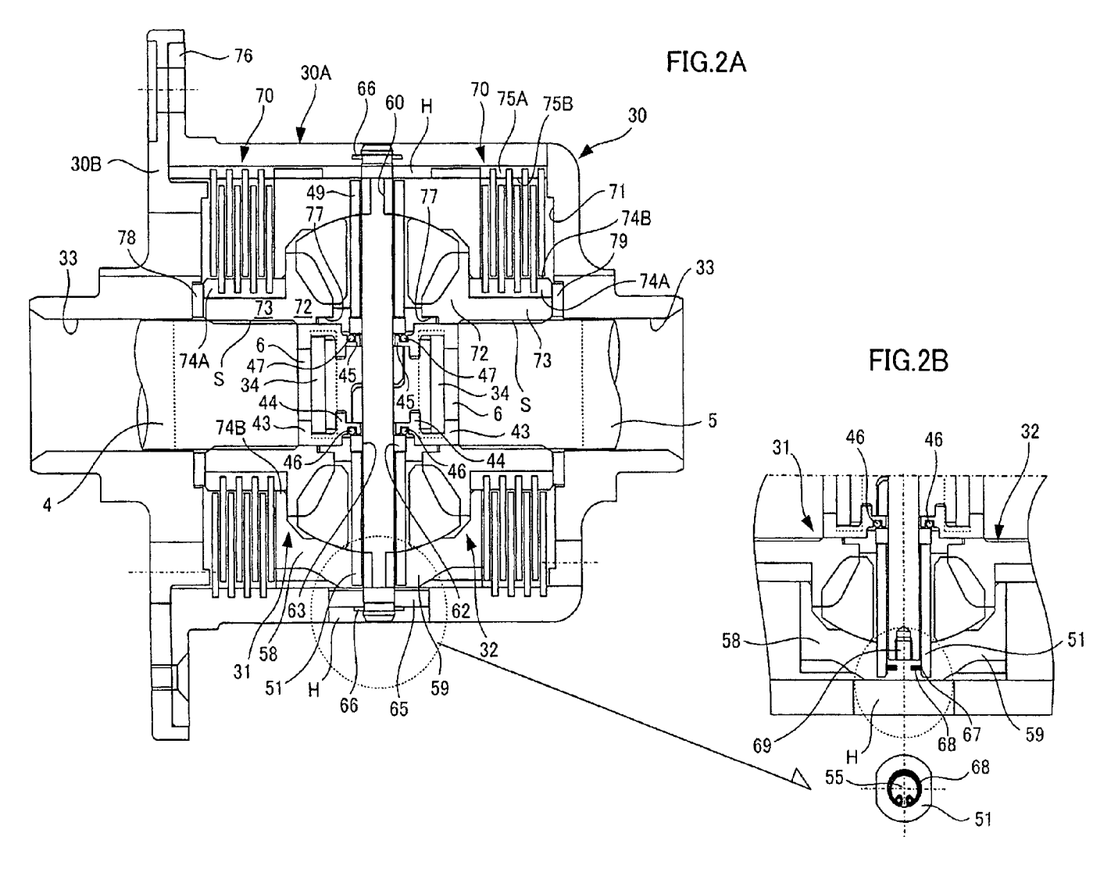
FIG. 2A is a longitudinal sectional view illustrating a differential assembly formed in the coupling structure of FIG. 1.
FIG. 2B is a view illustrating another stopper structure for a coupling shaft.

FIG. 1 is an exploded perspective view illustrating a coupling structure for a differential assembly and drive shafts according to an embodiment of the present invention. FIG. 2A is a longitudinal sectional view illustrating a differential assembly formed in the coupling structure of FIG. 1. FIG. 28 is a view illustrating another stopper structure for a coupling shaft.

Although not illustrated in FIG. 2A, the differential assembly is composed of a differential carrier 15 shown in FIG. 3. The assembly also includes long right and left drive shafts 4 and 5 to maintain the distance L between the tires. Note that the right and left drive shafts 4 and 5 have splines S formed on their end portion, and the splines S of the drive shafts 4 and 5 are to be engaged with those splines formed on the shaft hole of right and left side gears 31 and 32. In this structure, the end portions of the drive shafts 4 and 5 are inserted into and engaged with the splines on the shaft hole of the right and left side gears 31 and 32 through a bearing hole 33 of a differential case 30, respectively. The end portions of the drive shafts 4 and 5 each have a circumferential groove (hereinafter referred to as the first circumferential groove) 6, and each have an end flange 34 formed at a position toward the end of the shaft from the circumferential groove 6. According to the present embodiment, the end flange 34 has a diameter less than those of the drive shafts 4 and 5. Note that the differential case 30 is composed of a barrel portion 30A with its left end face opened and its right end closed, and a flat lid portion 30B for covering the left end opening of the barrel portion 30A.

As shown in FIG. 1, the end flanges 34 have coupling heads 35 and 36 on their end faces, respectively. Each of the right and left coupling heads 35 and 36 has a second circumferential groove 38 formed in front of a rear end flange 37 in the direction of the axle shaft, the flange portion 37 being less than the end flange 34 in diameter. Furthermore, in front of the second circumferential groove 38 in the direction of the axle shaft, there is formed a proximal portion 39 that is less than the rear end flange 37 in diameter. In front of the proximal portion 39 in the direction of the axle shaft, there is protruded a coupling hand 40, in which a coupling hole 41 is formed.

The coupling heads 35 and 36 are the same component formed in the same shape, each provided with the coupling hand 40 having a face formed at a position slightly dislocated from the diameter line of the proximal portion 39. Accordingly, with the right and left coupling heads 35 and 36 placed to oppose each other, both the coupling hands 40 are arranged in a staggered configuration across the diameter line of the proximal portion 39 with the respective faces abutting generally each other. This arrangement then allows the right and left drive shafts 4 and 5 to be pushed in until the respective coupling holes 41 formed in both the coupling hands 40 match each other on a center line CL.

With the rear end flange 37 being in contact with the respective end flange 34 of the drive shafts 4 and 5, the coupling heads 35 and 36 are mounted in place so as to encompass both the members by means of cylinder-shaped connectors 42. The connectors 42 are connected so that the coupling heads 35 and 36 are rotatable with respect to the drive shafts 4 and 5, respectively, and not movable in the direction of the shaft. This arrangement is achieved by allowing a first engagement flange 43, which is formed on the rear-end inner circumference of the connector 42 and extends toward the axial center, to engage with the first circumferential groove 6. This is also followed by allowing a second engagement flange 44, which is formed on the front-end inner circumference and extends toward the axial center, to engage with the second circumferential groove 38.

The connector 42 has two separable members that are symmetrical with respect to the center axial line, including a first connector portion 42A and a second connector portion 42B. With the first connector portion 42A and the second connector portion 42B being attached to each other, the connector 42 is designed to work as follows. The portion between the first engagement flange 43 and the second engagement flange 44 (hereinafter referred to as the connector body) has an outer diameter that is slightly less than the inner diameter of the splines on the side gears 31 and 32. Alternatively, the connector body has an outer diameter that is the same as the valley diameter of the splines S on the drive shafts 4 and 5. This configuration allows the connector 42 to be inserted into the shaft hole of the side gears 31 and 32 without interfering with the gears.

Both the coupling holes 41 of the coupling heads 35 and 36 being aligned to each other on the center line CL causes a connector end portion 45 extending frontwards from the connector body of the connector 42 to reach the end portion of the counterpart coupling hand 40, thereby completely covering the seam of the coupling hands 40. The end portion 45 of the connector 42 has an outer diameter that is less than the outer diameter of the connector body, and an O-ring groove 47 formed circumferentially in which an O-ring 46 fits.

The differential assembly of the present embodiment is a limited slip differential assembly, and thus includes a pinion shaft body (hereinafter referred to as the cross shaft) 53 on the center line CL. The cross shaft 53 has four pinion shafts 48, 49, 50, and 51 formed in the shape of a cross on a coupling ring 52. The cross shaft 53 has a circular tubular bore portion 54 formed at the center of the coupling ring 52, with an opposing pair of the first pinion shaft 48 and the third pinion shaft 50 being a solid shaft. Additionally, another opposing pair of the second pinion shaft 49 and the fourth pinion shaft 51 are each a hollow shaft which has a through hole 56 formed axially for a coupling shaft 55 to penetrate therethrough. The through hole 56 is aligned with the center line CL.

These four pinion shafts 48, 49, 50, and 51 have an end located within the differential case 30, and a cam portion 57 formed on the end portion engages with a cam surface portion 60 provided on the opposing faces of a pair of opposing right and left pressure rings 58 and 59. Furthermore, these four pinion shafts 48, 49, 50, and 51 each have a mate pinion gear 61 attached rotatably to a position nearer to the proximal end than to the cam portion 57, where the mate pinion gear 61 mates with the right and left side gears 31 and 32. Note that the outer circumferential surface of each pinion gear 61 is in contact with the inner circumferential surface of the right and left pressure rings 58 and 59, thereby preventing each pinion gear 61 from dislodging from each of the pinion shafts 48, 49, 50, and 51.

The tubular bore portion 54 of the coupling ring 52 is attached with a tubular sleeve member 62. Here, the sleeve member 62 is slightly greater in thickness than the coupling ring 52, thereby allowing both axial end faces of the sleeve member 62 to protrude outwardly in the direction of the axle shaft from both the axial end faces of the coupling ring 52. This design serves to transmit the axial input of the drive shafts 4 and 5 conveyed via a spacer ring 64 not to the coupling ring 52 but to the sleeve member 62. Accordingly, for example, a thrust force from the drive shaft 4 propagates, as it is, to the differential case 30 on the opposite side through the spacer ring 64, the side gear 32, and a shim 79. Then, via the coupling ring 52, the cross shaft 53 is subjected to the force in direction of the axle shaft, thus pushing the right and left pressure rings 58 and 59, so that the force has no adverse effects on the operation of the limit slip differential.

The sleeve member 62 is provided with shaft holes 63, to be centered on the center line CL, which are aligned with the through hole 56 of the second pinion shaft 49 and the fourth pinion shaft 51, respectively, and through which the coupling shaft 55 passes. Here, it holds that $d \approx d2 < d1$, where d is the diameter of the coupling shaft 55, d1 is the inner diameter of the through hole 56 which the coupling shaft 55 penetrates, and d2 is the inner diameter of the shaft hole 63 of the sleeve member 62. As such, since there is play between the coupling shaft 55 and the through hole 56, the force of the drive shafts 4 and 5 exerted on the coupling shaft 55 would not affect the cross shaft 53. This is because of the same reason as that for the sleeve member 62 being greater in thickness than the coupling ring 52.

Both the coupling hands 40 of the coupling heads 35 and 36 formed on the end portion of the right and left drive shafts 4 and 5 are opposed with each other and inserted into the sleeve member 62 located in the tubular bore portion 54 of the cross shaft 53, with both the coupling holes 41 aligned with the center line CL. The inner diameter of the sleeve member 62 is slightly less than the outer diameter of the end portion 45 of the connector 42, so that the end portion 45 of the connector 42 fits into the sleeve member 46. Accordingly, this allows for maintaining the integrity of the first connector portion 42A and the second connector portion 42B, which constitute the connector 42. Note that the O-ring 46 is attached to the outer circumferential surface of the connector end portion 45, thereby preventing the connector 42 and the coupling heads 35 and 36 from becoming dropped off during assembly of the drive shafts 4 and 5.

Furthermore, the right and left side gears 31 and 32 are provided on their respective end portion with a recessed portion 77 around the shaft hole, with the spacer ring 64 fitting in each recessed portion 77. The pair of opposing spacer rings 64 are in contact with the end face of the sleeve member 62.

The connector 42 requires no component to secure the first connector portion 42A and the second connector portion 42B to each other because of the following reason. This is because the rear end portion of the body is inserted in the shaft hole of each of the right and left side gears 31 and 32, and the front end portion of the body is inserted in the inner circumferential portion of the spacer ring 64. Thus, the first connector portion 42A and the second connector portion 42B are integrated with each other over the entire axial length in conjunction with the sleeve member 62.

On the barrel portion 30A of the differential case 30, a work hole H is formed on the center line CL corresponding to the second pinion shaft 49 and the fourth pinion shaft 51 to permit the insertion and extraction of the coupling shaft 55.

In the present embodiment, both the coupling hands 40 of the coupling heads 35 and 36 attached to the end portion of the right and left drive shafts 4 and 5 are opposed to each other and inserted into the sleeve member 62 to be received in the tubular bore portion 54 of the cross shaft 53, with both coupling holes 41 aligned with each other on the center line CL. Then, the coupling shaft 55 is inserted, for example, into the through hole 56 of the second pinion shaft 49 through the work hole formed on the barrel portion 30A of the differential case 30. The end of the coupling shaft 55 passes through one of the shaft holes 63 of the sleeve member 62, both the coupling holes 41, the other shaft hole 63, and the through hole 56 of the fourth pinion shaft 51, and goes into the opposite work hole as opposed to the fourth pinion shaft 51. Both end portions of the coupling shaft 55 are attached detachably with a rectangular stopper disk 65 via a snap ring 66, so that the stopper disk 65 abuts against the snap, ring 66, thereby preventing the coupling shaft 55 from being dislodged from the cross shaft 53. Note that the stopper disk 65 attached to both end portions of the coupling shaft 55 fits with play into the work hole H formed on the barrel portion 30A of the differential case 30. This structure is intended not to restrict the movement of the cross shaft 53 around the axle shaft relative to the differential case 30.

The stopper structure of the coupling shaft shown in FIG. 2B is implemented as follows. Both ends of the coupling shaft 55 are located inside the entire length of the second pinion shaft 49 and the fourth pinion shaft 51. Radially outside an end of the coupling shaft 55, the coupling shaft 55 is prevented from becoming dislodged, by engaging a C-shaped snap ring 68 with an inner circumference groove 67 formed on the inner circumferential surface of the through hole of the second pinion shaft 49 and the fourth pinion shaft 51. In the case of this stopper structure, the coupling shaft 55 is inserted tightly into the shaft holes 63 of the sleeve member 62, making it hard to extract the coupling shaft 55. Thus, the coupling shaft 55 is provided on its end face with a threaded hole 69, into which an extraction bolt (not shown) is screwed through the work hole H formed on the barrel portion 30A of the differential case 30. The extraction bolt makes it possible to extract the coupling shaft 55.

The limited slip differential assembly includes another constituent member or a friction clutch 70 which is disposed between the right and left side gears 31 and 32 and a sidewall portion 71 of the barrel portion 30A of the differential case 30. The right and left side gears 31 and 32 each include a gear portion 72 and a shaft portion 73. The shaft portion 73 is provided, on the outer circumferential surface thereof, with a recessed portion 74A and a projected portion 74B which extend along the axle shaft and are formed alternately in the circumferential direction. Furthermore, on the inner circumferential surface of the barrel portion 30A of the differential case 30, there are formed circumferentially alternately a recessed portion 75A and a projected portion 75B which extend in the direction of the axle shaft.

The movement of the sleeve member 62 in the direction of the axle shaft due to the pair of the right and left side gears 31 and 32 and the spacer ring 64 is prevented by means of a thrust bearing member (shim) 78 and a thrust bearing member (shim) 79. The shim 78 is disposed between the rear end of the shaft portion 73 of the left side gear 31 and the lid portion 30B of the differential case 30. The shim 79 is disposed between the rear end of the shaft portion 73 of the right side gear 32 and the barrel portion 30A of the differential case 30.

On the other hand, the friction clutch 70 includes a plurality of disk-shaped first friction clutch disks 70A and second friction clutch disks 70B which are disposed alternately and have a center hole at their center. The first friction clutch disk 70A has the center hole with an inner diameter greater than the outer diameter of the shaft portion 73 of the right and left side gears 31 and 32. On the outer circumferential surface, the disk 70A also has a recessed and projected portion formed to engage with the recessed portion 75A and the projected portion 75B formed on the inner circumferential surface of the barrel portion 30A. Accordingly, the first friction clutch disk 70A rotates integrally with the differential case 30 and is movable in the direction of the axle shaft. Furthermore, on the outer circumference of the right and left pressure rings 58 and 59, there is also formed a recessed and projected portion to engage with the recessed portion 75A and the projected portion 75B of the barrel portion 30A. This also allows for rotating integrally with the differential case 30 and moving in the direction of the axle shaft.

The second friction clutch disk 70B has an outer diameter less than the inner diameter of the barrel portion 30A and includes a recessed and projected portion, on the inner circumferential surface of the center hole, for engaging with the recessed portion 74A and the projected portion 74B formed on the outer circumferential surface of the shaft portion 73. Accordingly, the second friction clutch disk 70B is rotatable integrally with each of the right and left side gears 31 and 32 and movable in the direction of the axle shaft.

When the right and left pressure rings 58 and 59 move along the axle shaft apart from each other, the plurality of first friction clutch disks 70A and second friction clutch disks 70B of the right and left friction clutches 70 are brought into contact under pressure. This causes the right and left side gears 31 and 32 to be integrated with the differential case 30, thereby transferring the rotation of the differential case 30 to the right and left drive shafts 4 and 5 via the right and left side gears 31 and 32. Note that there may be provided a pressure spring (not shown) between the right and left pressure rings 58 and 59 in order to generate in advance a small amount of frictional force between the first friction clutch disk 70A and the second friction clutch disk 70B that constitute the right and left friction clutches 70. Alternatively, there may be disposed a pressure spring (not shown) between the sidewall portion 71 of the barrel portion 30A of the differential case 30 and the rearmost-end friction clutch disk, or the pressure spring may be provided on both of them.

Now, a description will be made to the operation of the slip limited differential assembly. For example, the power from a propeller shaft (not shown) is transferred to a ring gear 14 via a drive pinion gear (not shown) to rotate the differential case 30. The differential case 30 and the first friction clutch disk 70A rotate integrally. However, although the first friction clutch disk 70A and the second friction clutch disk 70B are kept in contact with each other by friction, the right and left pressure rings 58 and 59 rotating integrally with the differential case 30 rotate prior to the cross shaft 53. Thus, the cam surface portion 60 provided on the right and left pressure rings 58 and 59 engages with the cam portion 57 provided on the cross shaft 53, and the right and left pressure rings 58 and 59 push the right and left friction clutches 70. The first friction clutch disk 70A and the second friction clutch disk 70B are brought into intimate contact, causing the drive force to be transferred to the right and left side gears 31 and 32 via the second friction clutch disk 70B. The drive force rotationally drives the right and left drive shafts 4 and 5, thereby causing the tires to rotate.

When the tires start to be driven, the first to fourth pinion gears 61 keep mated with the gear portion 72 of the right and left side gears 31 and 32 without rotating relative to the pinion shafts 48 to 51, and rotate in conjunction with the pressure rings 58 and 59 on the right and left sides of the cross shaft 53 with no difference in rotational speed therebetween. Here, in response to acceleration, deceleration, or changes in load applied to the right and left tires, there arises a difference in rotation around the axle shaft between the cross shaft 53 and the right and left pressure rings 58 and 59. This difference causes a change in the engagement condition between the cam portion 57 and the cam surface portion 60. The change varies the push force by the right and left pressure rings 58 and 59 on the right and left friction clutches 70, thus allowing the same drive force to be transferred to the right and left tires.

The differential case 30 has a flange portion 76 formed to attach the lid portion 30B and the ring gear 14 to the opening end of the barrel portion 30A. In the differential case 30, the remaining components other than the coupling shaft 55, the right and left drive shafts 4 and 5, the coupling head 35, and the connector 42 are placed in position. Then, the case 30 is attached with the ring gear 14, and then installed inside the differential carrier.

The differential carrier is provided with a large maintenance opening, so that the work hole H for inserting the coupling shaft 55 for the differential case therethrough can be oriented to face the maintenance opening. Then, with the right and left drive shafts 4 and 5 attached with the coupling head 35 via the connector 42, the shafts 4 and 5 are passed through the bearing holes 33 of the differential case 30, respectively, and then coupled to each other with the splines through the respective shaft holes of the side gears 31 and 32. Each coupling head 35 is thus inserted into the sleeve member 62.

With the center of the coupling holes 41 of both the coupling hands 40 aligned with the center line CL, the coupling shaft 55 is inserted and pushed, for example, into the through hole 56 of the second pinion shaft 49 from its end through the work hole H of the barrel portion 30A. Then, when being further pushed, the shaft 55 passes through one of the shaft holes 63 of the sleeve member 62 and the other shaft hole 63 past both the coupling holes 41. The shaft 55 further goes through the through hole 56 of the fourth pinion shaft 51 and reaches the work hole H on the opposite side.

That is, the right and left drive shafts 4 and 5 are prohibited from moving in both directions along the axle shaft by the coupling shaft 55 being inserted in the coupling holes 41 of the coupling head 35 provided on top of the shafts 4 and 5. Furthermore, the right and left drive shafts 4 and 5 can be incorporated with ease because it is possible only by pushing the coupling shaft 55 into the differential case 30 from outside to prevent the drive shafts 4 and 5 from moving in the direction of the axle shaft.

In the aforementioned embodiment, the descriptions were made to an example where a drive shaft used for a typical differential assembly was also employed with no changes made thereto and mounted to a limited slip differential assembly serving as the differential assembly. However, it is also possible to employ a dedicated drive shaft for a typical differential assembly or the limited slip differential assembly.

Furthermore, the present invention is not limited to the limited slip differential assembly having the aforementioned structure, but is also applicable to a limited slip differential assembly of various configurations.

What is claimed is:

1. A coupling structure for a differential assembly and drive shafts, the structure comprising:
    a differential assembly at least including: a pair of right and left side gears which are disposed opposite to each other in a direction of an axle shaft within a differential case supported rotatably about the axle shaft with respect to a differential carrier; a pinion shaft body which is disposed between the pair of right and left side gears, the pinion shaft body including at least a pair of pinion shafts which extend radially outwardly opposite to each other from a coupling ring having a hole about the axle shaft, the pinion shaft body including a through hole formed longitudinally; and a pinion gear which is rotatably mounted on an end of the pinion shaft to mate with the pair of right and left side gears;
    a pair of right and left drive shafts which are coupled nonrotatably to the pair of right and left side gears, respectively, but movably in the direction of the axle shaft, and disposed with end faces thereof being opposed to each other by a given distance;
    a pair of right and left coupling heads each including a coupling hole at the point of intersection of an axial line of the pair of right and left drive shafts and an axial line of the pinion shaft, the coupling heads being attached to the pair of right and left drive shafts, respectively, to be rotatable about the axle shaft and not movable in the direction of the axle shaft, with an end portion thereof being disposed in the coupling ring of the pinion shaft body; and
    a coupling shaft which is inserted into the through holes of the pair of opposing pinion shafts through the coupling holes of the pair of right and left coupling heads.

2. The coupling structure for a differential assembly and drive shafts according to claim 1, wherein:
    the coupling heads and the drive shafts are connected to each other by a two-way split connector, the two-way split connector being composed of a pair of connector members symmetric with respect to a plane along the direction of the axle shaft, the connector members each being inserted over between an end portion of the drive shaft and a rear end portion of the coupling head and allowed to be inserted into the shaft hole of the side gear; and
    the end portion of the drive shaft has a first circumferential groove, the rear end portion of the coupling head has a second circumferential groove, and the connector has an inner circumferential surface in which engagement portions are formed to be engaged with the first and second circumferential grooves, respectively.

3. The coupling structure for a differential assembly and drive shafts according to claim 1, wherein:
    the coupling heads and the drive shafts are connected to each other by a two-way split connector, the two-way split connector being composed of a pair of connector members symmetric with respect to a plane along the direction of the axle shaft, the connector members each being inserted over between an end portion of the drive shaft and a rear end portion of the coupling head and allowed to be inserted into the shaft hole of the side gear; and
    the structure further comprises a spacer ring which is disposed between a front portion of the side gear and the coupling ring of the pinion shaft body, the spacer ring allowing the connector to be inserted thereinto.

4. The coupling structure for a differential assembly and drive shafts according to claim 1, wherein:
    the coupling heads and the drive shafts are connected to each other by a connector, the connector being inserted over between an end portion of the drive shaft and a rear end portion of the coupling head and allowed to be inserted into the shaft hole of the side gear;
    the end portion of the drive shaft has a first circumferential groove, the rear end portion of the coupling head has a second circumferential groove, and the connector has an inner circumferential surface in which engagement portions are formed to be engaged with the first and second circumferential grooves, respectively; and
    a top flange portion serving as a front end surface of the first circumferential groove has an outer diameter less than that of the drive shaft serving as a rear end surface of the first circumferential groove.

5. The coupling structure for a differential assembly and drive shafts according to claim 1, wherein:
    the coupling heads and the drive shafts are connected to each other by a connector, the connector being inserted over between an end portion of the drive shaft and a rear end portion of the coupling head and allowed to be inserted into the shaft hole of the side gear; and
    the end portion of the drive shaft has a first circumferential groove, the rear end portion of the coupling head has a second circumferential groove, and the connector has an inner circumferential surface in which engagement portions are formed to be engaged with the first and second circumferential grooves, respectively, so that the engagement portions are rotatable with respect to the first and second circumferential grooves.

6. The coupling structure for a differential assembly and drive shafts according to claim 1, further comprising a tubular sleeve member disposed in the coupling ring of the pinion shaft body, the tubular sleeve member having shaft holes to which the coupling shaft is to be inserted and which are aligned with the through holes of the pinion shaft, and the sleeve member having an inner circumferential portion in which end portions of the pair of right and left coupling heads are disposed.

7. The coupling structure for a differential assembly and drive shafts according to claim 1, further comprising: a tubular sleeve member disposed in the coupling ring of the pinion shaft body, the tubular sleeve member having shaft holes to which the coupling shaft is to be inserted and which are aligned with the through holes of the pinion shaft, the tubular sleeve member having an inner circumferential surface; and a connector which is inserted over between an end portion of the drive shaft and a rear end portion of the coupling head, the connector adding the coupling head and the drive shaft so as to allow them to be rotatable about the axle shaft and not movable in the direction of the axle shaft, the connector having end portions being disposed along the inner circumferential surface of the tubular sleeve member, and wherein the sleeve member has an inner circumferential portion in which end portions of the pair of right and left coupling heads are disposed.

8. The coupling structure for a differential assembly and drive shafts according to claim 1, wherein:
both end portions of the coupling shaft are located inside end portions of the through holes of the opposing pinion shafts in a longitudinal direction; and
the coupling structure further comprises a stopper member detachably provided to an inner circumferential surface of the through hole so as to be in contact with the end portions of the coupling shaft.

9. The coupling structure for a differential assembly and drive shafts according to claim 1, wherein:
the differential assembly is a limit slip differential assembly;
both end portions of the coupling shaft reach the differential case; and
the structure further comprises stopper members detachable provided to the respective end portions of the coupling shaft.

10. The coupling structure for a differential assembly and drive shafts according to claim 1, wherein the differential assembly is a limit slip differential assembly.

* * * * *